UNITED STATES PATENT OFFICE.

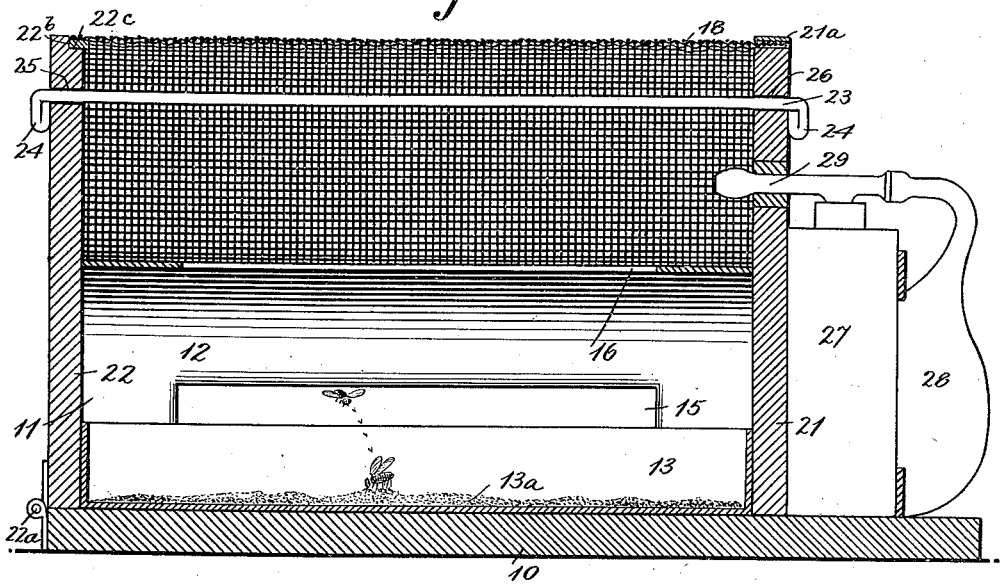
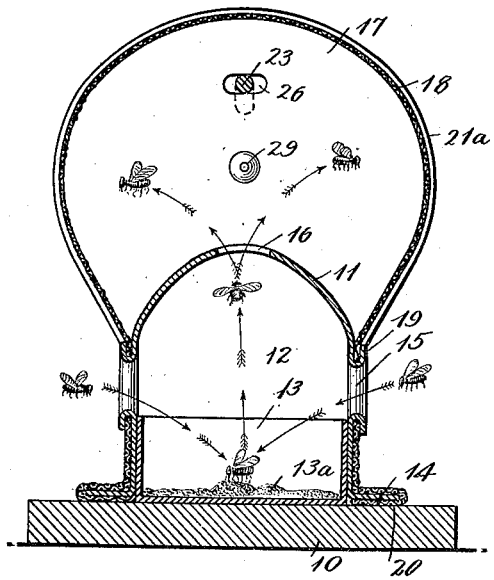
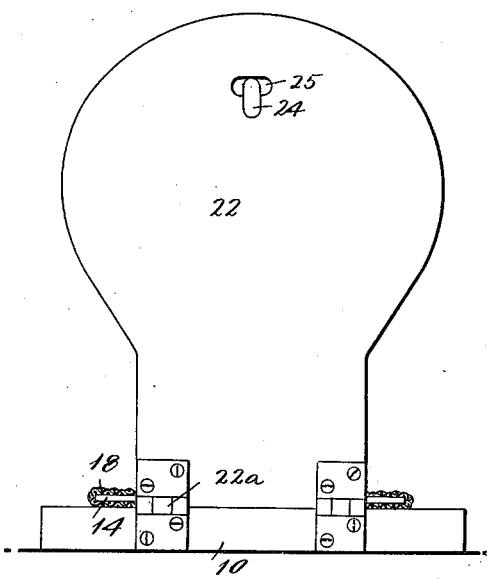

CHARLES HARDING CURTIS, OF BLUFFTON, FLORIDA.

FLY-TRAP.

1,092,697.  Specification of Letters Patent.  Patented Apr. 7, 1914.

Application filed June 26, 1913. Serial No. 775,882.

*To all whom it may concern:*

Be it known that I, CHARLES H. CURTIS, a citizen of the United States, and a resident of Bluffton, in the county of Volusia and State of Florida, (post-office, Astor, Lake county, Florida,) have invented a new and Improved Fly-Trap, of which the following is a full, clear, and exact description.

My invention relates to a fly trap having a compartment forming a bait chamber, and a second trap chamber into which the flies enter from the bait chamber, and in which they are trapped.

In carrying out my invention a trap chamber is formed of woven wire or equivalent reticulated or openwork material, and is arranged above the bait chamber, provision being made for clamping the sides of the woven wire to the sides of the bait chamber. In connection with the trap such as indicated, I provide a sprayer, the nozzle of which is so arranged that a spray of insecticide to destroy the flies may be directed into the trap chamber.

The invention will be particularly explained in the specific description following.

Reference is to be had to the accompanying drawings forming a part of this specification, in which similar characters of reference indicate corresponding parts in all the views.

Figure 1 is a longitudinal vertical section of a fly trap embodying my invention; Fig. 2 is a cross sectional view; and Fig. 3 is a rear end view showing a hinged door giving access to both the bait chamber and the trap chamber.

In forming a trap in accordance with my invention a suitable base 10 is provided in the form of a flat board or plate, and to the upper side of the base is secured a casing 11 arching transversely, as shown in Fig. 2, the casing forming a bait chamber 12 accommodating at the bottom thereof, a removable bait box or receptacle 13, to contain bait or lure, as indicate at 13ª. The casing in the instance shown is formed with outwardly extending base flanges 14, which are suitably secured to the base 10.

In the sides of the casing 11 elongated openings 15 are formed, and in the dome-shaped top of the casing an elongated outlet opening or slot 16 is produced, leading upwardly into the trap chamber 17, above the bait chamber. The chamber 17 is inclosed at the sides and top by a transversely arched covering 18 of woven wire or equivalent openwork material that will afford free entrance of light to induce the upward passage of flies from the bait chamber below. The woven wire fabric 18 is clamped close against the outer sides of the casing 11, and the entrance opening 15 extends through said fabric as well as through the casing 11, as will be clear from Fig. 2. In the example shown, the fabric 18 is secured by turning over the material of the casing 11 at the defining edges of the openings 15; the fabric also at its base is turned under the lateral flanges 14 of the casing 11, and is thus securely held by the latter, the arrangement producing also a neat and desirable finish.

One end 21 of the trap consists of a board or plate rising perpendicularly from the base 10, said end extending over the full transverse area of both the bait chamber 12 and the trap chamber 17. The fabric 18 may overlap the end 21, and be suitably secured thereto as by a strip 21ª (Fig. 1). At the opposite end a vertical door 22 is provided and hinged at its lower end to the base 10 by a suitable hinge or hinges 22ª. The door may be rabbeted, as at 22ᵇ, to receive a frame member 22ᶜ to which the adjacent edge of the fabric 18 is secured. The door 22 forms a closure for the adjacent ends of both the bait chamber and the trap chamber, and when swung downwardly affords access to said chambers.

In order to hold the door closed a fastener rod 23 extends through the trap chamber 17, the ends being formed with heads 24 offset laterally at one side of the fastener rod. The door 22 and the fixed end 21 are formed respectively with elongated slots 25, 26, through which the heads 24 may be passed to permit a longitudinal movement of the fastener rod through one or the other of the said slots for permitting the door to be lowered.

Adjacent to the fixed end member 21 of the trap, I mount on the base 10 a sprayer which may consist of a reservoir 27, a bulb 28 and a nozzle 29. The nozzle extends inwardly through the end 21 to the interior of the trap chamber 17, and is disposed axially of the latter, so that a spray of poisonous substance may be directed from the nozzle in the direction of the door 22. The spray will thus tend to cause the flies to collect adjacent to the door, being the point farthest from the spray. In any event the spray will have a range of practically the whole length of the trap chamber, and effectively destroy the flies so that they may be readily removed from the trap chamber by opening the door 22.

Having thus described my invention, I claim as new, and desire to secure by Letters Patent:

1. A fly trap, comprising a base, a casing secured to the base and forming a bait chamber, the said casing having an arched top, a trap chamber adjacent to the open end of the bait chamber formed of foraminous material, the said material extending inwardly to the sides of the casing and secured at its lower end, the casing and said material having alined longitudinal slots in the sides, and the material of the casing at the slots being turned outward and serving to clamp the foraminous material, said casing having an opening in the arched top thereof leading to the trap chamber.

2. A fly trap, comprising a base, a casing secured to said base and having a side opening for the entrance of flies, said casing forming a bait chamber and being open at one end, a trap chamber above the casing, said trap chamber being inclosed by open-work material, said material having connection at its sides with the sides of the casing, and said trap chamber being open at the end adjacent to the open end of the belt chamber, there being an opening leading from the bait chamber upwardly to the trap chamber, a door common to the open ends of the bait chamber and trap chamber, and means for holding the door in closed position to close the ends of the said chambers.

3. A fly trap, comprising a base, a casing forming a bait chamber and having an entrance opening for flies and an outlet through the top thereof, a trap chamber above the bait chamber, one end of the bait chamber and the corresponding end of the trap chamber being open, the opposite end of the trap having a fixed closure for the ends of said chambers, a door at the open ends of the chambers, the door being hinged at its lower end to the base and having a slot near its upper end, there being an alined slot in the opposite fixed end of the trap, and a latch rod extending longitudinally through the fixed end of the trap, the trap chamber and the door, and the ends of the rod having means movable through the slots in one position of the rod.

4. A fly trap, comprising a bait chamber, a trap chamber above the bait chamber, there being an inlet opening leading to the bait chamber and an outlet from the bait chamber to the trap chamber, and a sprayer mounted on the trap and having a spray nozzle extending into the trap chamber at one end, the nozzle being disposed in the direction of the opposite end of the trap chamber.

In testimony whereof I have signed my name to this specification in the presence of two subscribing witnesses.

CHARLES HARDING CURTIS.

Witnesses:
GRANT BLY,
E. D. McLEOD.

---

Copies of this patent may be obtained for five cents each, by addressing the "Commissioner of Patents, Washington, D. C."